United States Patent [19]

Finke et al.

[11] 4,366,520

[45] Dec. 28, 1982

[54] DIFFERENTIAL TRANSFORMER CORE FOR PULSE CURRENTS

[75] Inventors: Guenter B. Finke, Cherry Hill, N.J.; Bao-Min Ma, Philadelphia, Pa.

[73] Assignee: Magnetic Metals Corporation, Camden, N.J.

[21] Appl. No.: 247,439

[22] Filed: Mar. 25, 1981

[51] Int. Cl.³ .............................................. H02H 3/28
[52] U.S. Cl. .................................... 361/45; 336/212; 336/213; 336/234
[58] Field of Search ............................ 361/44, 45, 46; 336/212, 213, 234

[56] References Cited

FOREIGN PATENT DOCUMENTS 521125 5/1940 United Kingdom ................ 336/213

Primary Examiner—Harry E. Moose, Jr.
Attorney, Agent, or Firm—Pollock, Vande Sande & Priddy

[57] ABSTRACT

A plurality of relatively high magnetic permeability strips are interleaved to form layers of a closed loop differential transformer core. Although the material of each layer by itself may have a relatively square hysteresis loop, the core formed of a plurality of interleaved layers of such material has a substantially more rounded hysteresis loop. Such a core can advantageously be used in a ground fault interruption circuit in which power leads pass through a central opening in the core to form a primary winding and a secondary winding wound on the core may have a capacitor connected in circuit therewith to complete a resonant circuit. By virtue of its more rounded hysteresis loop, the core, in cooperation with the capacitor, permits the establishment of a resonant current in the secondary circuit which is sufficient to trip a circuit breaker after a few cycles of operation of the alternating current or pulsed unidirectional primary current when a small differential current exists between the power leads as a result of a ground fault.

10 Claims, 9 Drawing Figures

PLURAL INTERLEAVED SHEETS

TRANSFORMER CORE

DIFFERENTIAL TRANSFORMER CORE FOR PULSE CURRENTS

FIELD OF THE INVENTION

The present invention relates to differential transformers, and more particularly to a core structure for such a transformer which is adapted for use with ground fault interrupting circuit breakers.

BRIEF DESCRIPTION OF THE PRIOR ART

Differential transformer cores for ground fault interrupting circuit breakers are known in the art. An example of this type of technology is described in an article by Guenter B. Finke, one of the co-inventors of the present invention, entitled "Differential Transformer Cores for Ground Fault Interrupting Circuit Breakers", *IEEE TRANSACTIONS ON MAGNETICS*, Vol. MAG-10, No. 2, June, 1974, page 13.

As mentioned in the article, ground fault interrupting circuit breakers (GFI) are devices that interrupt an electrical supply circuit when a "fault current" of a predetermined value flows from this circuit to ground. This current may be sinusoidal or a pulsed unidirectional current as frequently exists when silicon controlled rectifiers are employed in the monitored circuit such as a lamp dimmer, for example. The ability with use of such a device to interrupt a circuit after only a few current cycles makes it possible to protect humans and animals from the hazards of severe electrical shock.

The operation of the GFI is such that the ground fault current $I_T$, which may be only 5 to 30 mA for protection of persons and animals (and say 300 mA for fire protection) with a load current I up to 50 amperes, produces a detectable change in the magnetization of the differential transformer. Thus, in the absence of a ground fault, the current in the two wires carrying the load current are exactly equal and opposite so that no resultant core magnetization occurs; however, any current imbalance in response to a ground fault produces a resultant magnetization and it is the objective of the GFI to sense this magnetization. In the United States the requirement is that the GFI shall open the circuit in response to a maximum ground fault current of only 5 mA. To accomplish this, an electronic amplifier is required to be used in conjunction with the magnetic core. Most European countries have standardized on a ground fault current of 30 mA for tripping a relay driven circuit breaker which, of course, is high enough to de-energize a relay directly, i.e., without an amplifier. This, however, places strict performance requirements on the core material for the differential transformer.

Differential transformers used for the direct tripping 30 mA GFI devices generally employ a 0.10 mm Supermalloy strip. In a typical application the cores are about 20 mm in diameter with an area of 1 cm². The material is heat treated for high maximum permeability ($\mu_{max} \geq 200,000$) so that a fault current of 30 mA in one or more turns will magnetize the core to a flux density of about 2,000 to 5,000 gauss providing sufficient output energy for a direct tripping relay. Since GFIs may be installed outside the temperature-controlled living area, the high maximum permeability is usually required to be stabilized over the operating temperature range from $-15°$ C. to $+45°$ C.

The prior art has described temperature range stabilization of high permeability nickel alloys such as Supermalloy (80.25 Ni, 4.25% Mo, Re-Fe) by heat treating the alloy at lower than normal temperatures where increased Ni$_3$Fe ordering will take place. This process shifts the magnetocrystalline anisotropy point, where $K_1 = 0$, to a lower temperature, so that the permeability peak $\mu(T)$ occurs at a lower temperature, normally just below the temperature range of the GFI operation.

However, hysteresis loop characteristics also change. At high temperatures at which $K_1 < 0$, above the $\mu(T)$ peak, the material has a more square hysteresis loop that limits its usefulness in differential transformers for operation with pulsed unidirectional currents. Thus, the above-described prior art GFIs do not work reliably with unipolar pulsed waves.

The prior art, for example as described in German Pat. No. 2036497, issued Apr. 28, 1977, recognized that by connecting a capacitor either in series or parallel with the secondary winding of a differential transformer, the unipolar magnetization can be transferred by resonance phenomena into a sufficiently high bidirectional amplitude of magnetization to result in sufficient energy in the core's secondary circuit to trip a breaker relay. However, in order to establish resonance in response to a unidirectional current in the primary circuit, the hysteresis loop of the core must be relatively round as opposed to square shaped.

Two known prior art approaches are directed to achieving a rounded hysteresis loop. A first such prior art approach has been to generate a uniaxial preferred orientation perpendicular to an applied field by heat treating the cores at temperatures between 250° C. and 350° C. in an axial field. However, the process is labor intensive and production is not easily controlled. As a result, an unsatisfactory yield is obtainable.

A second prior art method for obtaining a rounded hysteresis loop is achieved by fast cooling or quenching of a core structure from temperatures above 500° C. to set the magnetocrystalline anisotropy constant ($K_1$) equal to zero at a temperature above the operating range of the core. Although this type of treatment will produce a rounded hysteresis loop, it will cause a strong decrease of permeability toward lower operating temperatures, thereby changing the resonance characteristics of the circuit and necessitating an increase of the trip current for a circuit breaker above the prescribed 30 mA.

BRIEF DESCRIPTION OF THE PRESENT INVENTION

The present invention is directed to a differential transformer core structure which offers a rounded hysteresis loop that is compatible with the establishing of resonance in the core's secondary circuit. We have found that a more rounded hysteresis loop will result by interleaving two or more strips of relatively high magnetic permeability wound into a closed configuration. Although the characteristics of the material used are such that the winding of a single strip of such material into a core may produce an undesirable square hysteresis loop, we have unexpectedly found that the interleaving of two or more such strips produces a substantially more rounded hysteresis loop having the characteristics of those produced by the prior art approaches, but without the above-mentioned disadvantages. The present core structure, characterized by the necessary rounded hysteresis loop, may be manufactured with a great degree of repeatability and is operable in a resonant circuit over a large operating temperature range. Further, the cores can be heat treated to the lowest coercive field and the highest permeability which results in high magnetization and therefore relatively low core volume. From a practical consideration, this offers the advantage of reduced cost as well as minimizing the amount of space required for the core in the GFI.

The above-mentioned objects and advantages of the present invention will be more clearly understood when considered in conjunction with the accompanying drawings, in which:

DETAILED DESCRIPTION OF THE INVENTION

Figure 1:
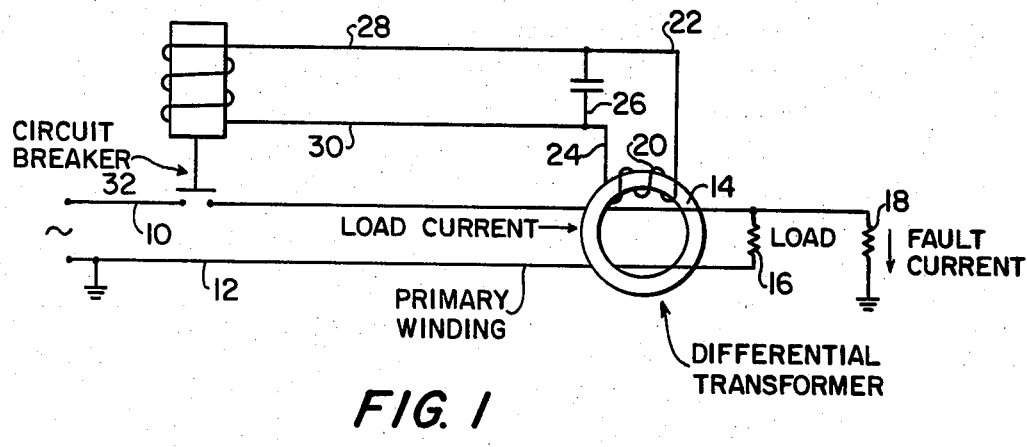
FIG. 1 is a schematic illustration of a differential current transformer employed in a ground fault interrupting circuit breaker.

FIG. 1 illustrates a prior art ground fault interrupting circuit of the type disclosed in the previously mentioned German Pat. No. 2036497. Power wires 10 and 12 are connected at the left input terminals to a sinusoidal voltage source. Wires 10 and 12 are wound with a few turns about a core 14 and terminate in a load 16. By passing through core 14, the wires 10 and 12 form a primary winding. In normal operation, the current flowing through wire 10 is the same as that flowing in wire 12 but in the opposite direction. In the event an object such as a human or animal comes into contact with the wire 10 on the load side at core 14, a fault current will flow to ground through resistance 18 which corresponds to the object. This will increase the current in wire 10 compared so that in wire 12 thereby producing a resultant magnetizing current and a corresponding magnetic field in core 14. A second winding 20 is wound on the core 14 and a capacitor 26 is connected in parallel, via wires 22 and 24, with winding 20 so as to form a resonant circuit.

A primary design objective for a core 14 is a round hysteresis loop, but with high magnetic permeability, which will cause sufficient resonance current to be developed after only a few cycles of fault current to cause the circuit breaker 32 to trip so as to interrupt the current flowing through wire 10 and thereby quench the fault current through object 18.

Figure 5:
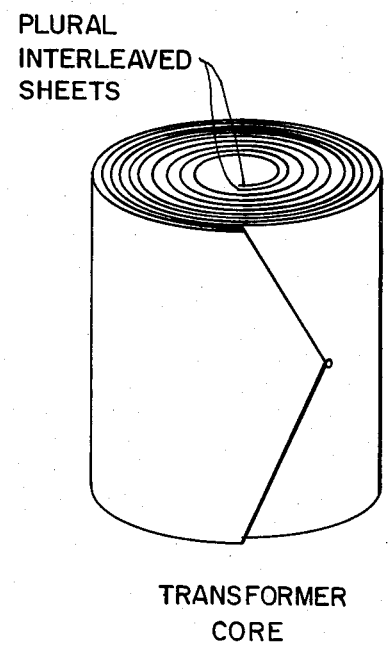
FIG. 5 is a perspective view of the present core structure utilizing multi-layers.

As previously mentioned, the magnetic core of the invention, as illustrated in FIG. 5, produces the necessary rounded hysteresis loop and does so over a wide range of operating temperatures. Furthermore, the hysteresis loop obtainable with the present core structure permits an interruptor circuit such as shown in FIG. 1 to be used with unipolar pulse input power as well as sinusoidal excitation.

Figure 2A:
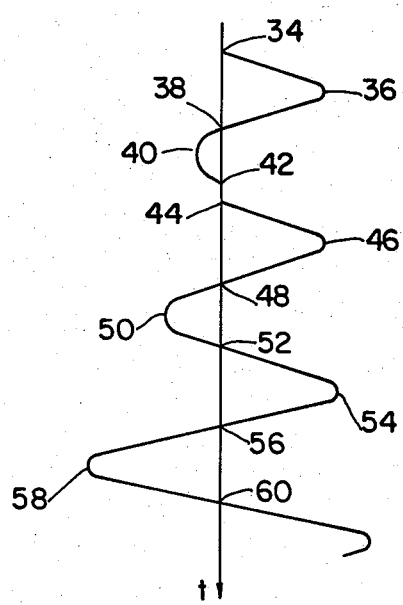
FIG. 2A is a graphical plot of fault and resonance current as a function of time.
Figure 2B:
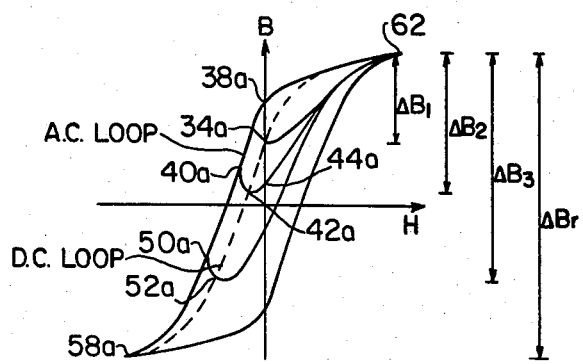
FIG. 2B is a hysteresis loop for the pulse mode, corresponding to the current plot shown in FIG. 2A.

In order to gain a better understanding of the significance of a proper rounded hysteresis loop configuration, reference is made to FIGS. 2A and 2B which illustrate the magnetization cycle of the transformer core by unipolar pulse currents and the beginning of a resonance effect. At the beginning of the unipolar pulse fault current indicated by point 34, the core 14a rests in the remanent state at point 34a. During the first half-wave, the core will be magnetized to point 62, generating a flux change $\Delta B_1$. At the end of the first half-cycle, the core will be at point 38a.

During this first half-cycle, the flux change $\Delta B_1$ will have induced a voltage in the secondary circuit producing a current flow that charges capacitor 26. The capacitor 26 will discharge commencing at the end of the first half-cycle which will demagnetize the core to point 40a. During the time when the fault current is zero, between points 42 and 44, the magnetization of the core will fall from point 40a of the AC hysteresis loop down to point 42a which is on the DC hysteresis loop.

The next half cycle, beginning at point 44 and reaching its maximum at point 46, will magnetize the core from point 44a to 62, producing now a larger flux density change $\Delta B_2$ which will produce a greater charging of capacitor 26. The discharge current of the capacitor 26 indicated by the current change from points 48 to 52 will demagnetize the core from points 38a to 52a.

The next pulse cycle from points 52 to 56 will magnetize the core from points 52a to 62, producing a still greater flux density change $\Delta B_3$. Discharging current from the capacitor occurring between points 56 and 60 will demagnetize the core from points 38a to 58a. From there on the core will be in resonance and will be continuously magnetized between points 58a to 62 to provide an output signal sufficiently large to trip the circuit breaker 32.

In order to initiate resonance as just explained in connection with FIGS. 2A and 2B, the hysteresis curve of the core must have such a configuration that the first few cycles can provide a substantial flux density change. Those skilled in the art will readily recognize that a core having a conventional rectangular hysteresis loop would, under the circumstances just described, produce such a small $\Delta B$ that resonance would not readily be established.

FIG. 5 shows an embodiment of the inventive transformer core 14a which is fabricated by interleaving two or more sheets as the core is wound. The outer edge of the core may be tapered and spot welded at point 64 in order to prevent the core from unwinding. Other conventional methods would be equally appropriate.

In a preferred embodiment of the present invention, Supermalloy metal is used for the core strips, although other magnetically permeable materials capable of generating the necessary round hysteresis loop may be employed. Supermalloy comprises 80% nickel, 5% molybdenum, the remainder being iron. It should be understood, however, that the inventive concept of the invention is not intended to be limited to the use of such material since other magnetic metal alloys may be used and it is further intended that the invention shall include the use of so-called glassy magnetic materials of the Fe-B type and others. Initially, the core strips are coated with an inert coating of magnesium oxide or aluminum oxide which may be applied either prior to winding the core or by pulling a strip, coated with oil film, through an aluminum oxide or magnesium oxide powder. Next, two or more layers or strips are wound into a shaped core and a spot weld 64 is applied to retain the core shape. The core may be of any conventional annular configuration including toroidal, square, etc.

The design consideration regarding shape is that the core be a closed structure.

Next, the core is subjected to a heat treatment. The heat treatment employed may be that which is conventionally used in the manufacture of tape wound cores. Such treatment typically may include heating the cores to high temperatures near 1180° C. for a suitable time, such as one to four hours, followed by a furnace cooling. A secondary heat treatment may follow at 485° C. for one hour, followed by a rapid cooling in order to set the order/disorder ratio in the crystal structure and to set the crystal anisotropy point $K_1=0$ at approximately $+10°$ C. This provides a maximum permeability in excess of 200,000, often as high as 350,000 or 400,000, and a minimum change of permeability in the temperature range from $-20°$ C. to $+80°$ C. In a single layer wound core, such a heat treatment would provide a hysteresis loop which will be too rectangular, thus preventing a circuit as shown in FIG. 1 from going into resonance. By winding two or more layers simultaneously, the hysteresis loop of the core will be rounded off, thus allowing the design of a resonance circuit which will safely go into resonance. The strip thickness used for these cores is normally 0.1 millimeter but can vary from 0.025 millimeter to 0.15 millimeter. The thicknesses are chosen to minimize the eddy current core losses.

The examples given here are of cores formed by winding high permeability material of the same thickness and the same material in two or more layers. It should, however, be pointed out that the invention will also provide the above-noted highly desirable effects by winding materials of slightly different thickness, and also by winding materials of different alloys simultaneously to provide a rounded hysteresis loop. However, all the materials should have a coercive force which is low and not too dissimilar.

Figure 3A:
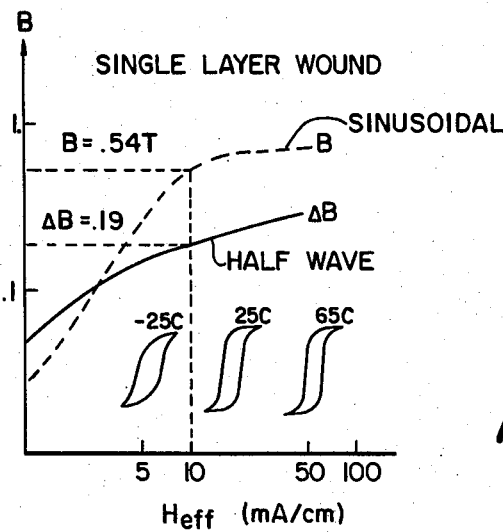
FIGS. 3A–3D are B-H curves and superimposed hysteresis loops of single and multi-layer wound cores produced by the present invention.
Figure 3B:
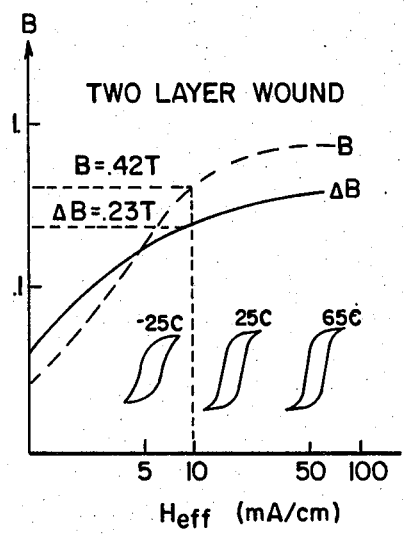
Figure 3C:
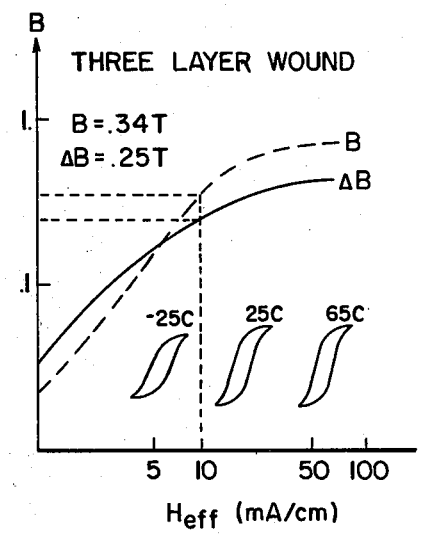
Figure 3D:
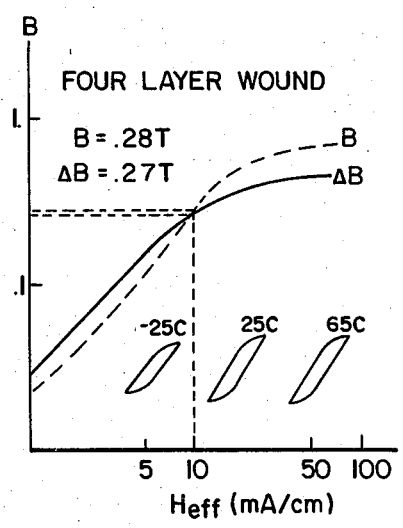

FIG. 3A demonstrates that a single layer core has a relatively square hysteresis loop which will not go into resonance at temperatures above 25° C. FIGS. 3A–3D also show the B-H curves for pulse waves and sinusoidal excitation. The single layer core (FIG. 3A) has a relatively high sinusoidal permeability. The single layer core plot shows that at 10 mA per centimeter, which is approximately the working point of a differential transformer in a 30 mA GFI breaker, the sinusoidal induction is relatively high at 0.54 Tesla, while the halfwave magnetization is relatively low with 0.19 Tesla. The same material wound in two layers has at 10 mA per centimeter sinusoidal magnetization, a flux density of 0.42 Tesla and a halfwave magnetization of 0.23 Tesla, as shown at FIG. 3B. In other words, the halfwave magnetization has increased when using two layers while the AC magnetization has decreased, which is desirable in order that a GFI designed for use with a particular core shall trip at about the same magnitude of ground fault current irrespective of whether the primary current is sinusoidal or of unipolar pulse form. Even further improvements, i.e., an increase in the pulse magnetization and a slight decrease in the sinusoidal magnetization, occur when three and four layers are wound simultaneously as shown in FIGS. 3C and 3D. The superimposed hysteresis loops in FIGS. 3B–3D show the increasing roundness of the hysteresis loops by winding 2, 3 and 4 layers. They also show that the loops, and therefore the magnetization at a given field strength do not change greatly with operating temperature, which means that the trip current of the circuit breaker 32 will remain fairly constant despite variation in the operating temperatures.

Figure 4:
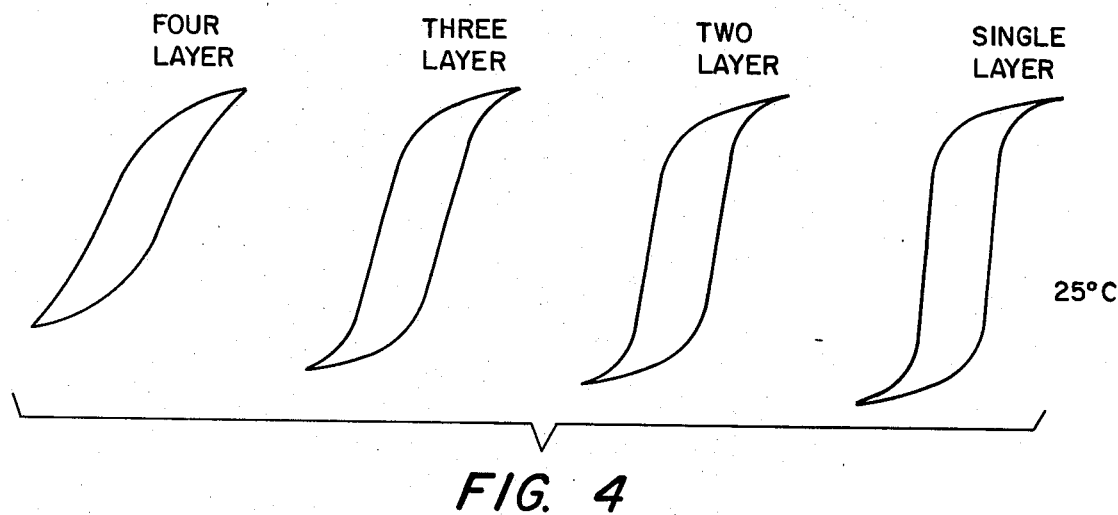
FIG. 4 is a comparative view illustrating the increasing roundness of hysteresis loops as a function of increasing layers in a core.

FIG. 4 illustrates the progressive rounding of the hysteresis loops, for a given operating temperature such as 25° C. as a function of the number of core layers.

Accordingly, it will be appreciated that the present invention offers the advantage of a core having the round hysteresis loop characteristics required for resonant circuit operation of a ground fault circuit interruptor. By virtue of winding a plurality of interleaved strips forming a multi-layer closed core, the present invention may be used successfully with either AC or unipolar pulse applications over a wide range of normal operating temperatures. The inventive core as shown in FIG. 5 is expeditiously manufactured with a high yield of reliable components.

It should be understood that the invention is not limited to the exact details of construction shown and described herein for obvious modifications will occur to persons skilled in the art.

Although the invention has been particularly described in connection with the use of magnetic cores in a ground fault interruptor circuit, it will be apparent to those skilled in the art that its utility is not limited to such an application. Thus, the invention is useful whenever it is desired to produce a closed magnetic core with a generally rounded hysteresis loop characteristic, and especially when it is desired to be able to produce such cores with a high degree of uniformity of their magnetic characteristics (and thus high yield) and with high stability over a wide range of operating temperatures.

We claim:

1. In a tape-wound magnetic transformer core,
   means for rounding the B-H hysteresis loop of the core and for inclining the loop in relation to the B axis,
   said means comprising the winding of the core with a plurality of interleaved layers of magnetizable material,
   the material of said interleaved layers all being of high permeability and of similar coercivity.

2. The core set forth in claim 1 wherein input terminals are provided at the first end of the primary winding, the terminals being adapted to receive sinusoidal or unipolar pulse excitation.

3. The core set forth in claim 1 wherein the resonant circuit forming means includes a capacitor.

4. The core of claim 1 in which said magnetizable material has a permeability of about 200,000 or more.

5. A ground fault circuit interruptor comprising:
   a transformer core having a plurality of coaxially wound interleaved strips of magnetically permeable material for producing a rounded hysteresis loop;
   a primary winding having at least one pair of wires passing through the core and connectable at a first end thereof to a voltage source and at an opposite end thereof to a load;
   a secondary winding wound on the core; and
   means connected in circuit with the secondary winding for interrupting current flow through a load in response to a preselected differential current flow through the wires resulting from fault current flowing from one of the wires to ground.

6. The interruptor set forth in claim 5 together with means connected in circuit with the secondary winding for forming a resonant circuit therewith in response to a preselected differential current flow and actuating the current interrupting means after a few cycles of the fault current.

7. The subject matter set forth in claim 6 wherein the resonant circuit forming means includes a capacitor.

8. A method for interrupting a power circuit, in response to accidental contact, by an object with the circuit, thus causing a fault current, the method comprising the steps of:
  coaxially winding a plurality of interleaved layers of magnetically permeable material to form a core having a rounded hysteresis loop;
  positioning a primary winding through the core, the winding being connectable at a first end thereof to a voltage source and at an opposite end thereof to a load;
  positioning a secondary winding on the core;
  connecting an impedance across the secondary winding to form a resonant circuit therewith; and
  connecting the resonant circuit to an electromagnetic circuit breaker, the latter being connected in circuit with the primary winding, for interrupting the power circuit after a few cycles of the fault current.

9. Apparatus comprising in combination,
  a transformer core comprising a plurality of interleaved layers coaxially wound in a closed path, the layers being fabricated from magnetically permeable material of relatively low and similar coercivity, the core producing a rounded hysteresis loop,
  a primary winding comprising at least one pair of wires passing through the core and connectable at a first end thereof to a voltage source and at an opposite end thereof to a load,
  a secondary winding wound on the core, and
  means connected across the secondary winding for interrupting current flow through a load in response to a preselected differential current flow in the wires.

10. Apparatus comprising in combination,
  a transformer core comprising a plurality of interleaved layers coaxially wound in a closed path, the layers being fabricated from magnetically permeable material of relatively low and similar coercivity, the core producing a rounded hysteresis loop,
  a primary winding comprising at least one pair of wires passing through the core and connectable at a first end thereof to a voltage source and at an opposite end thereof to a load,
  a secondary winding wound on the core,
  circuit breaking means connected in circuit with the wires, and
  means connected in circuit with the secondary winding for forming a resonant circuit therewith in response to a preselected differential current flow through the wires thus actuating the circuit breaking means after a few cycles of resonance.

* * * * *